United States Patent
Siwko et al.

(10) Patent No.: US 8,422,390 B2
(45) Date of Patent: *Apr. 16, 2013

(54) METHOD AND APPARATUS FOR TRANSPORTING DETERMINISTIC TRAFFIC IN A GIGABIT PASSIVE OPTICAL NETWORK

(75) Inventors: John Siwko, Austin, TX (US); Andrew Jeffrey Hall, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 174 days.

This patent is subject to a terminal disclaimer.

(21) Appl. No.: 12/847,889

(22) Filed: Jul. 30, 2010

(65) Prior Publication Data

US 2010/0296810 A1    Nov. 25, 2010

Related U.S. Application Data

(63) Continuation of application No. 11/426,212, filed on Jun. 23, 2006, now Pat. No. 7,768,936.

(51) Int. Cl.
*H04J 14/08* (2006.01)

(52) U.S. Cl.
USPC ............ 370/252; 370/458; 370/468; 398/48; 398/58

(58) Field of Classification Search ........................ None
See application file for complete search history.

(56) References Cited

U.S. PATENT DOCUMENTS

| 7,444,419 B2 * | 10/2008 | Green .......................... 709/231 |
| 7,768,936 B2 * | 8/2010 | Siwko et al. .................. 370/252 |
| 2002/0163695 A1 * | 11/2002 | Unitt et al. .................... 359/137 |
| 2003/0179769 A1 | 9/2003 | Shi et al. ........................ 370/442 |
| 2004/0109689 A1 | 6/2004 | Song et al. ...................... 398/69 |
| 2006/0209711 A1 * | 9/2006 | Kerpez ........................... 370/252 |
| 2006/0233197 A1 * | 10/2006 | Elmoalem et al. ............ 370/468 |

OTHER PUBLICATIONS

International Search Report and Written Opinion for PCT/US2007/070331, Nov. 14, 2007, consists of 11 pages.
Examiner's Report for CA 2,650,504, Feb. 21, 2011, consists of 3 pages.
H.C. Leligou, at al., Efficient medium arbitration of FSAN-compliant GPONs, Wiley Interscience, [Online], Nov. 14, 2005, pp. 603-617.
"Gigabit-capable Passive Optical Networks (G-PON): Transmission convergence layer specification; G.984.3 (Feb. 2004)", ITU Standard in Force (I), International Telecommunication Union, Geneva, CH, No. G9843 2/4, Feb. 22, 2004.
J.D. Angelopoulos et al., "Efficient Transport of Packets With QOS in an FSAN-Aligned GPON", IEEE Communications Magazine, IEEE Service Center, NY, NY, vol. 42, No. 2, Feb. 2004, pp. 92-98.
Xie Jing, et al., A dynamic bandwidth allocation scheme for differentiated services in EPONs, IEEE Communications Magazine, IEEE Service Center, Piscataway, US, vol. 42, No. 8, Aug. 2004, pp. S32-S39.

* cited by examiner

*Primary Examiner* — Chi H. Pham
*Assistant Examiner* — Shick Hom

(57) ABSTRACT

A system and method are disclosed for transporting deterministic traffic in a gigabit passive optical network. A system that incorporates teachings of the present disclosure may include, for example, an Optical Line Termination (OLT) for exchanging data traffic in a Gigabit Passive Optical Network (GPON) having a controller programmed to generate a timeslot schedule for transport of a desired bandwidth of constant bit rate (CBR) data traffic by selecting one or more timeslots from periodic frame clusters operating according to a GPON Transmission Convergence (GTC) protocol. Additional embodiments are disclosed.

16 Claims, 5 Drawing Sheets

100

METHOD AND APPARATUS FOR TRANSPORTING DETERMINISTIC TRAFFIC IN A GIGABIT PASSIVE OPTICAL NETWORK

This application is a continuation of U.S. Ser. No. 11/426,212, filed Jun. 23, 2006, now U.S. Pat. No. 7,768,936, issued Aug. 3, 2010, and is herein incorporated by reference in its entirety.

FIELD OF THE DISCLOSURE

The present disclosure relates generally to gigabit passive optical networks, and more specifically to a method and apparatus for transporting deterministic traffic in said networks.

BACKGROUND

Gigabit passive optical network (GPON) is a communications access architecture recently developed by the International Telecommunications Union (ITU) Study Group 15 and published as standards ITU-T G.984.1 through ITU-T G.984.4.

This standard provides the flexibility for network elements in a GPON network to dynamically assign timeslots in frames during an active communications session. Reassignment of timeslots, however, can cause jitter and latency which in turn can cause undesirable interruptions and/or inoperability of a communication session involving constant bit rate (CBR) data traffic such as voice and or video. Additionally, CBR data traffic can be significantly interrupted during an Operations, Administrative and Management (OAM) cycle which utilizes up to two consecutive frames.

A need therefore arises for a method and apparatus for transporting deterministic traffic in a GPON network.

DETAILED DESCRIPTION

Embodiments in accordance with the present disclosure provide a method and apparatus for transporting deterministic traffic in GPON networks.

In a first embodiment of the present disclosure, an Optical Line Termination (OLT) for exchanging data traffic in a Gigabit Passive Optical Network (GPON) can have a controller programmed to generate a timeslot schedule for transport of a desired bandwidth of CBR data traffic by selecting one or more timeslots from periodic frame clusters operating according to a GPON Transmission Convergence (GTC) protocol.

In a second embodiment of the present disclosure, an Optical Network Unit (ONU) for exchanging data traffic in a Gigabit Passive Optical Network (GPON) can have a controller programmed to receive a timeslot schedule from an Optical Line Termination (OLT) identifying one or more timeslots selected by the OLT from periodic frame clusters according to a desired bandwidth of at least one among Constant Bit Rate (CBR) and non-deterministic (ND) data traffic services associated with CBR and ND Transmission Containers (T-Conts) of the ONU, and transmit CBR and ND data traffic of the CBR and ND T-Conts according the timeslot schedule.

In a third embodiment of the present disclosure, a method can generate at an Optical Line Termination (OLT) a schedule for transport of Constant Bit Rate (CBR) data traffic in a Gigabit Passive Optical Network (GPON), wherein the schedule identifies one or more data units selected by the OLT from periodic data clusters according to a desired bandwidth of the CBR data traffic.

Figure 1:
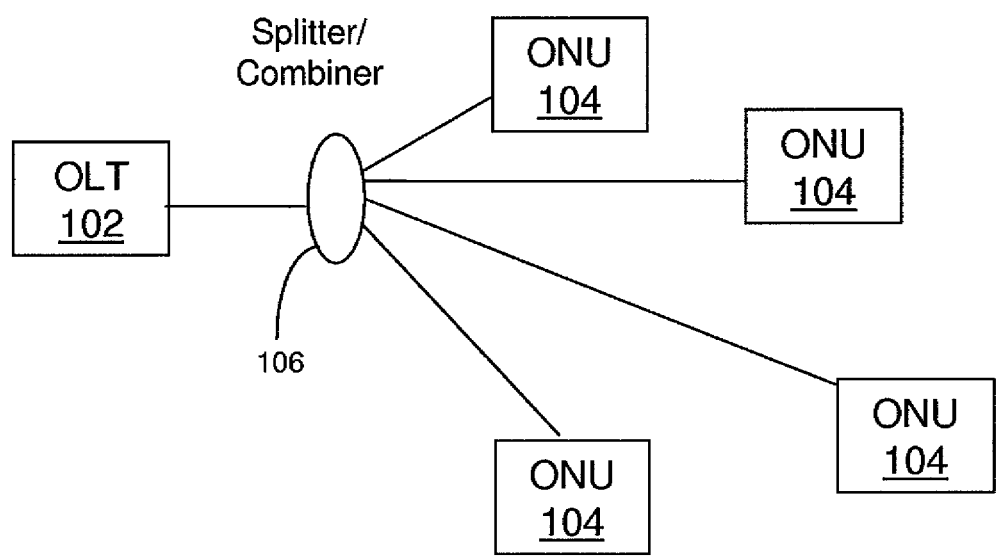
FIG. 1 depicts an exemplary embodiment of a portion of a Gigabit passive optical network (GPON) communication system.

FIG. 1 depicts an exemplary embodiment of a portion of a Gigabit Passive Optical Network (GPON) communication system 100. The GPON communication system 100 comprises an Optical Line Termination (OLT) 102 coupled to one or more Optical Network Units (ONUs) 104 by way of one or more common splitters or combiners 106. The OLT 102 and ONUs 104 operate according to a GPON Transmission Convergence (GTC) protocol and utilize a controller comprising common computing technology for routing digital traffic between end points of the GPON communication system 100. Digital traffic can include Constant Bit Rate (CBR) traffic such as a voice and/or video, non-deterministic traffic such as common Internet traffic, and Operations, Administrative and Management (OAM) data traffic represented by network management functions that provide network fault indication, ONU initialization, performance information, and data and diagnosis functions among other things.

Figure 2:
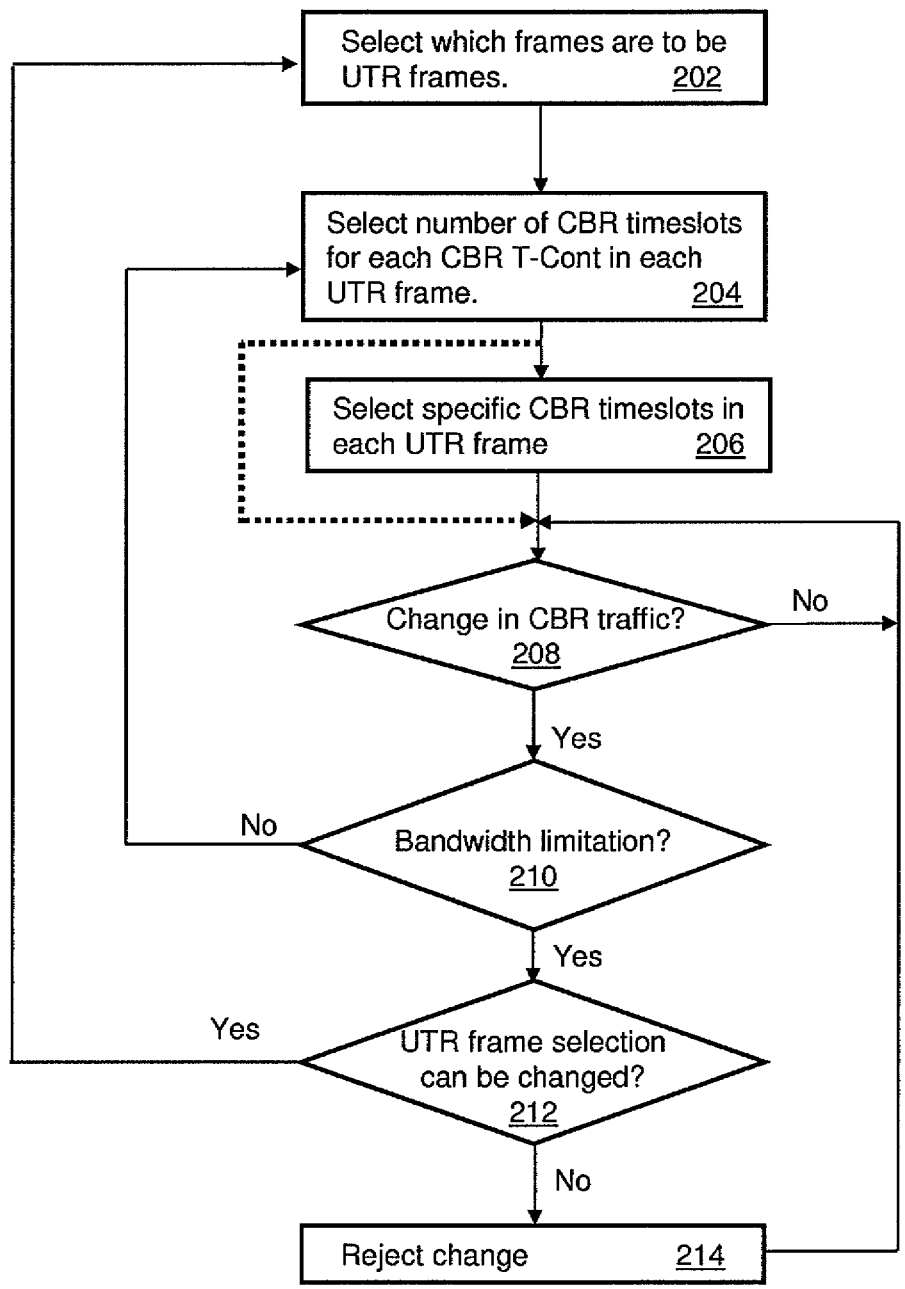
FIGS. 2-3 depict exemplary methods operating in the GPON communication system.
Figure 3:
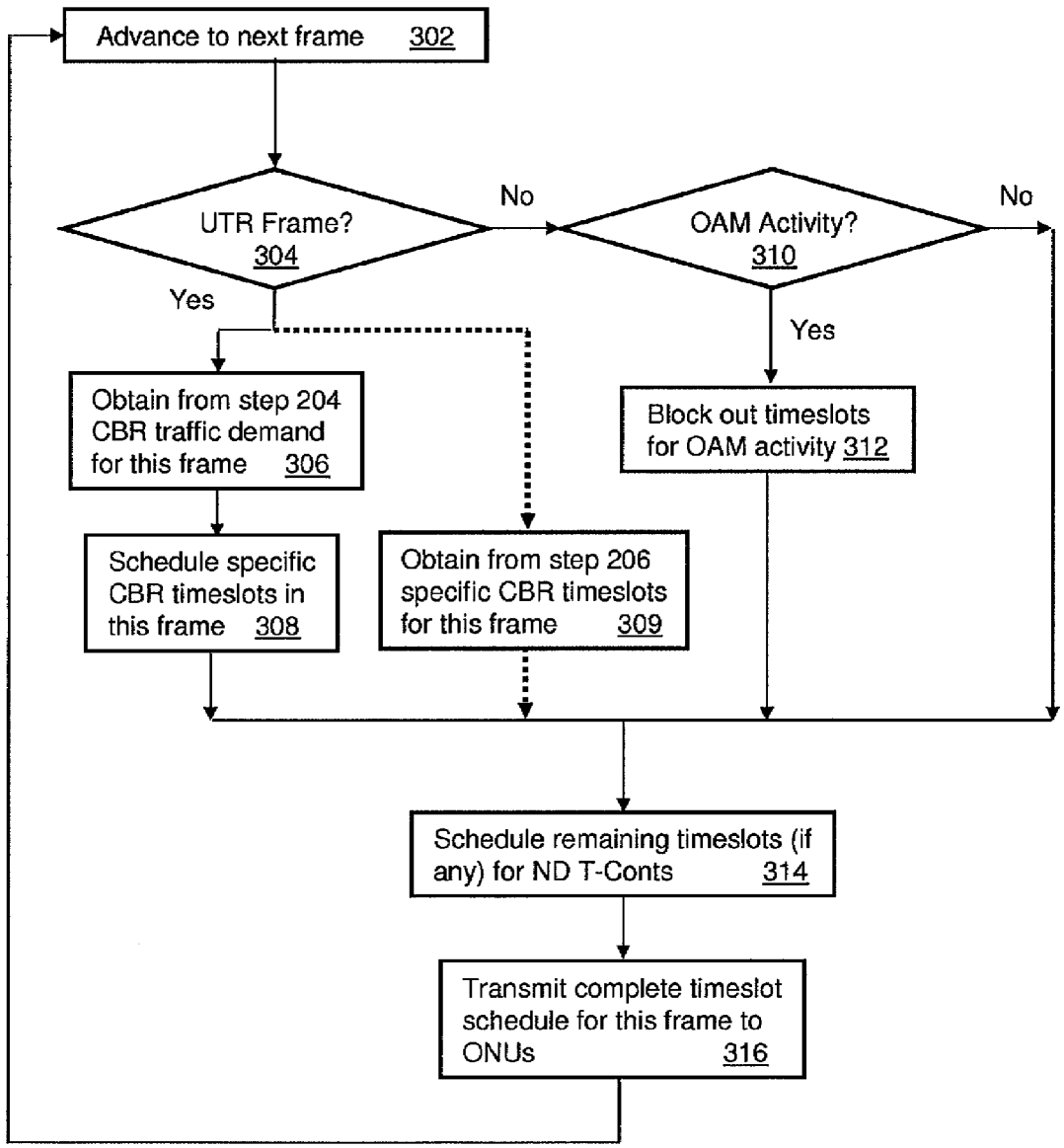
Figure 4:
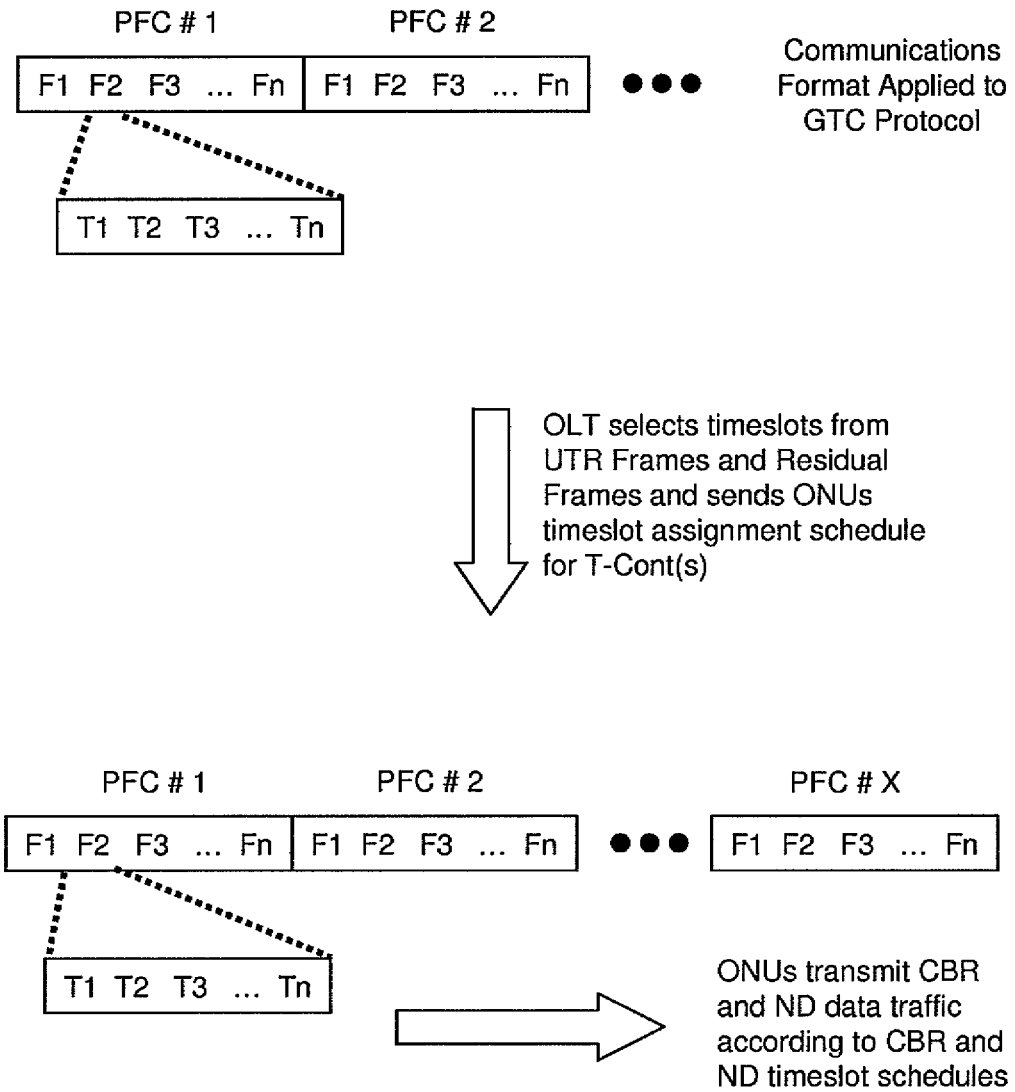
FIG. 4 depicts and exemplary block diagram of GTC frame and timeslot assignment according to the methods of FIGS. 2-3.

FIGS. 2-3 depict exemplary methods 200-300 operating in the OLT 102 of communication system 100. Method 200 describes a means for selecting frames and timeslots, while method 300 depicts a complementary method for assigning timeslots. To reduce jitter and latency due to dynamic timeslot assignments in prior art GPON communication systems, the OLT 102 can be programmed in step 202 to organize GTC frames into periodic frame clusters (PFCs) (see FIG. 4). From the PFCs the OLT 102 can be programmed in step 202 to select a portion of said GTC frames as reserved for CBR and non-deterministic (ND) data traffic ("User Traffic Reserved Frames") while the remaining portion of said GTC frames is available for ND data traffic, and Operations, Administrative and Management (OAM) data traffic ("Residual Frames").

In step 204, the OLT 102 selects a number (which could be zero) of timeslots (not actual timeslot assignments) in each UTR frame for each CBR Transmission Container (T-Cont) of the ONUs 104. The numbers of timeslots granted to the CBR T-Conts may (and is likely to) form a repeating pattern whose period may last one or more PFCs. A T-Cont represents a logical grouping of data ports of a corresponding ONU 104 having similar service characteristics. Timeslot assignments are granted by the OLT 102 to each T-Cont of an ONU 104. The number of timeslots selected for a particular T-Cont can depend on a desired bandwidth for each data traffic stream associated with the T-Cont. The OLT 102 can determine or assume bandwidth requirements for each CBR T-Cont through a variety of means well known to artisans of ordinary skill in the art. For example, from the OLT 102 can have pre-provisioned information, or can receive signaling information originating at any number of network elements (including the ONUs 104) in the GPON communication system 100.

Once the UTR frames and number of timeslots have been selected for each T-Cont, the OLT 102 can proceed in a first embodiment to step 208 where it checks for bandwidth changes in the CBR traffic. If there is no change, the OLT 102 continues to operate with the frame assignments, and the numbers of timeslots selected in step 204. If on the other hand a CBR traffic change is requested or detected in step 208, the OLT 102 proceeds to step 210 where it checks if there's a bandwidth limitation with the current UTR frame assignment. This step is particularly important when the CBR traffic has increased in bandwidth. If the CBR traffic bandwidth has increased, and there's available bandwidth to support this change, then the OLT 102 proceeds to step 204 where it selects a greater number of timeslots. If the CBR traffic bandwidth has been reduced, then the OLT 102 proceeds to step 204 where it reduces the number of timeslots assigned to the CBR traffic in the UTR frames.

When a bandwidth limitation is detected in step 210 in which no additional timeslots are available to support an increase in CBR traffic, the OLT 102 proceeds to step 212 and determines if the UTR frame selection can be changed. For example, suppose there are 24 GTC frames in a PFC with 20 of said frames (F1 through F20) assigned as UTR Frames, and 4 frames (F21 through F24) assigned to Residual Frames. Suppose further that the only system consideration is that at least 2 GTC frames in each PFC must be Residual Frames. In this instance, since the Residual Frames do not require more than 2 GTC frames to support OAM cycles, the OLT 102 can proceed to steps 202-204 and select a new set of frames and a new number of timeslots to support the change in CBR traffic. If instead 22 out of the 24 UTR frames in a PFC had been previously assigned to UTR traffic, then the OLT 102 would have no choice but to proceed to step 214 and reject the request to increase CBR traffic since at least two frames must be reserved for OAM cycles.

In another embodiment, the OLT 102 can be programmed in step 206 to assign specific CBR timeslots to each UTR frame over one or more UTR frames of a PFC cycle. This step can reduce jitter by creating a static and regular timeslot pattern for CBR traffic across multiple UTR frames. Steps 202-214 thus provide a means for defining UTR frames and Residual Frames with dynamic timeslot assignments in one embodiment, and static timeslot assignments in another.

FIG. 3 illustrates method 300 which describes the steps to assign timeslots in each GTC frame of the PFCs. Method 300 begins with step 302 in which the OLT 102 advances to perform timeslot assignments for the next GTC frame. In step 304, the OLT 102 checks whether the GTC frame it has advanced to is a UTR frame or a Residual frame. If it is a UTR frame, then in one embodiment the OLT 102 proceeds to step 306 where it obtains from step 204 the number of timeslots to be assigned in this frame to each CBR T-Cont. In step 308, the OLT 102 uses the obtained numbers to schedule specific timeslots in this UTR frame to CBR T-Conts. In step 314, the OLT 102 schedules the remaining timeslots (if any are available) to ND T-Conts. The timeslot schedule is then transmitted in step 316 to the T-Conts of the ONUs 104 which transmit CBR and ND traffic upstream according to this schedule. The OLT 102 then proceeds to step 302 where it repeats another cycle of method 300 for a GTC frame.

Steps 306-308 assume an embodiment in which the OLT 102 does not assign static timeslots, but rather reserves a number of timeslots for each UTR frame. In this embodiment, timeslots are assigned dynamically for each UTR frame. Although a dynamic assignment can cause some additional jitter and/or latency, the flexibility to assign timeslots provides for a means to manage the operation of fiber optic equipment such as lasers to reduce the on and off cycles which can cause a loss of timeslot usage. To better manage the dynamic scheduling of timeslots for CBR and ND T-Conts, steps 308 & 314 can be combined as one step to minimize the power cycling of fiber optic lasers.

In an alternative embodiment, the OLT 102 can be programmed to proceed from step 304 to step 309 where it obtains from step 206 the specific timeslots assigned to CBR T-Conts in this UTR frame. This embodiment provides a static assignment of timeslots. Although it can have an impact on the power cycling of fiber optic lasers, it helps to reduce jitter and latency for time sensitive CBR traffic. Once the CBR schedule has been determined, the OLT 102 proceeds as before to step 314 and assigns the remaining timeslots to the ND T-Conts, and transmits in step 316 the timeslot schedule to the T-Conts of the ONUs 104 which transmit CBR and ND traffic upstream according to this schedule. The OLT 102 then proceeds to step 302 where it repeats another cycle of method 300 for a GTC frame.

Referring back to step 304, if the GTC frame in question belongs to the Residual Frames, then the OLT 102 proceeds to step 310 where it checks whether OAM activity needs to occur. If OAM activity is not required, then the OLT 102 proceeds to step 314 where it assigns all available timeslots of the unused Residual Frames to the ND T-Conts, and proceeds to step 316 as described earlier. If on the other hand, OAM activity is required, the OLT 102 proceeds to step 312 where it blocks out timeslots for OAM activity. The number of timeslots can be as many as two full frames scheduled over one or more PFC cycles. As before, the OLT 102 assigns timeslots to the ND T-Conts if timeslots are available, and proceeds to step 316 to transmit the timeslot schedule to the ONUs 104.

It would be evident to an artisan with ordinary skill in the art that the aforementioned embodiments can be modified, reduced, or enhanced without departing from the scope and spirit of the claims described below. For example, the OLT 102 can be programmed to select static timeslots for time sensitive CBR traffic, and dynamically select timeslots for other less sensitive CBR traffic. This is but one example of modifications that can be applied to the present disclosure. Accordingly, the reader is directed to the claims below for a fuller understanding of the breadth and scope of the present disclosure.

Figure 5:
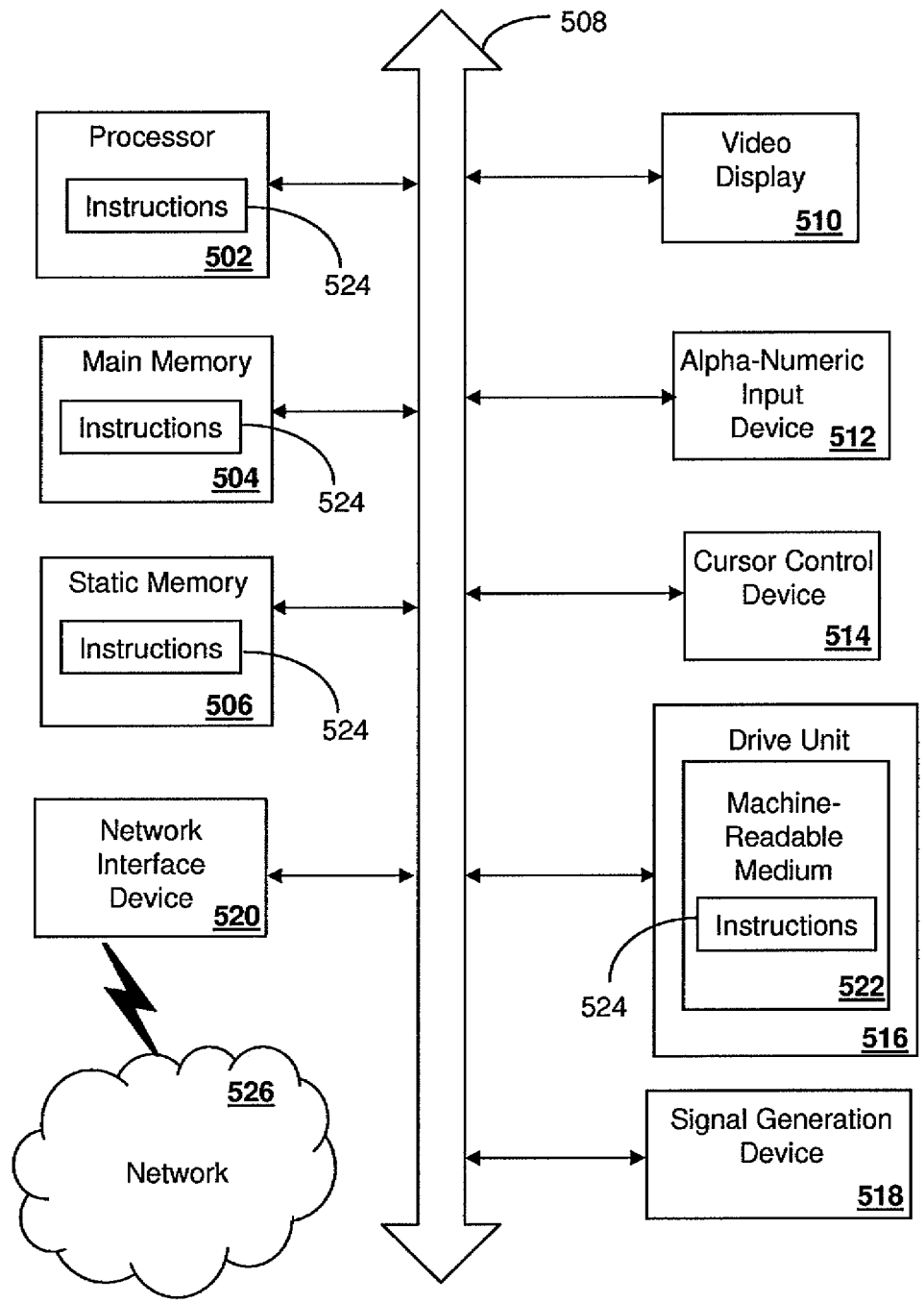
FIG. 5 depicts an exemplary diagrammatic representation of a machine in the form of a computer system within which a set of instructions, when executed, may cause the machine to perform any one or more of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An optical line termination for exchanging data traffic in a gigabit passive optical network, comprising:
   a processor; and
   a computer-readable medium in communication with the processor, storing a plurality of instructions which, when executed by the processor, cause the processor to perform operations, the operations comprising:
     generating a timeslot schedule for transport of a desired bandwidth of constant bit rate data traffic by selecting a timeslot from periodic frame clusters operating according to a gigabit passive optical network transmission convergence protocol, wherein each of the periodic frame clusters comprises a plurality of frames, wherein a portion of the plurality of frames is reserved for constant bit rate data traffic and non-deterministic data traffic.

2. The optical line termination of claim 1, wherein the operations further comprise reusing a portion of the timeslot schedule that supports the desired bandwidth of constant bit rate data traffic for each cycle of a plurality of cycles of the periodic frame clusters.

3. The optical line termination of claim 1, wherein the operations further comprise generating a new timeslot schedule that supports the desired bandwidth of constant bit rate data traffic for each cycle of a plurality of cycles of the periodic frame clusters.

4. The optical line termination of claim 1, wherein a portion of the timeslot schedule that supports the desired bandwidth of constant bit rate data traffic has a period that spans a cycle of a plurality of cycles of the periodic frame clusters.

5. The optical line termination of claim 1, wherein the operations further comprise determining which transmission containers in an optical network unit provide constant bit rate data traffic service, and which transmission containers provide non-deterministic data traffic service.

6. An optical network unit for exchanging data traffic in a gigabit passive optical network, comprising:
   a processor; and
   a computer-readable medium in communication with the processor, storing a plurality of instructions which, when executed by the processor, cause the processor to perform operations, the operations comprising:
     receiving a timeslot schedule from an optical line termination identifying a timeslot selected by the optical line termination from periodic frame clusters according to a desired bandwidth of at least one among constant bit rate and non-deterministic data traffic services associated with constant bit rate transmission containers and non-deterministic data transmission containers of the optical network unit, wherein each of the periodic frame clusters comprises a plurality of frames, wherein a portion of the plurality of frames is reserved for constant bit rate data traffic and non-deterministic data traffic; and
     transmitting constant bit rate data traffic and non-deterministic data traffic of the constant bit rate transmission containers and non-deterministic data transmission containers according to the timeslot schedule.

7. The optical network unit of claim 6, wherein the operations further comprise receiving from the optical line termination a portion of the timeslot schedule that supports the desired bandwidth of constant bit rate data traffic for each cycle of a plurality of cycles of the periodic frame clusters.

8. The optical line termination of claim 6, wherein the operations further comprise receiving from the optical line termination a new timeslot schedule that supports the desired bandwidth of constant bit rate data traffic for each cycle of a plurality of cycles of the periodic frame clusters.

9. A method, comprising:
   generating, at an optical line termination having a processor, a schedule for transport of constant bit rate data traffic in a gigabit passive optical network, wherein the schedule identifies a data unit selected by the optical line termination from periodic data clusters according to a desired bandwidth of the constant bit rate data traffic, wherein each of the periodic data clusters comprises a plurality of frames, wherein a portion of the plurality of frames is reserved for constant bit rate data traffic and non-deterministic data traffic.

10. The method of claim 9, further comprising:
    reusing a portion of the schedule that supports the desired bandwidth of constant bit rate data traffic for each cycle of a plurality of cycles of the periodic frame clusters.

11. The method of claim 9, further comprising:
    generating a new schedule that supports the desired bandwidth of constant bit rate data traffic for each cycle of a plurality of cycles of the periodic frame clusters.

12. The method of claim 9, wherein a portion of the schedule that supports the desired bandwidth of constant bit rate data traffic has a period that spans a cycle of a plurality of cycles of the periodic frame clusters.

13. The method of claim 9, further comprising:
    transmitting the schedule to an optical network unit for transport of the constant bit rate data traffic according to the schedule.

14. The method of claim 9, wherein a data unit comprises a timeslot, and wherein the data unit conforms to a gigabit passive optical network transmission convergence protocol.

15. The method of claim 9, wherein another portion of the plurality of frames is reserved for non-deterministic data traffic and operations, administrative and management activities, and wherein the method further comprises selecting the data unit for the constant bit rate data traffic from the portion of the plurality of frames that is reserved for the constant bit rate data traffic and non-deterministic data traffic.

16. The method of claim 15, further comprising:
    selectively assigning to a transmission container providing constant bit rate services the data unit selected from the portion of the plurality of frames that is reserved for the constant bit rate data traffic and non-deterministic data traffic.

* * * * *